Patented July 19, 1932

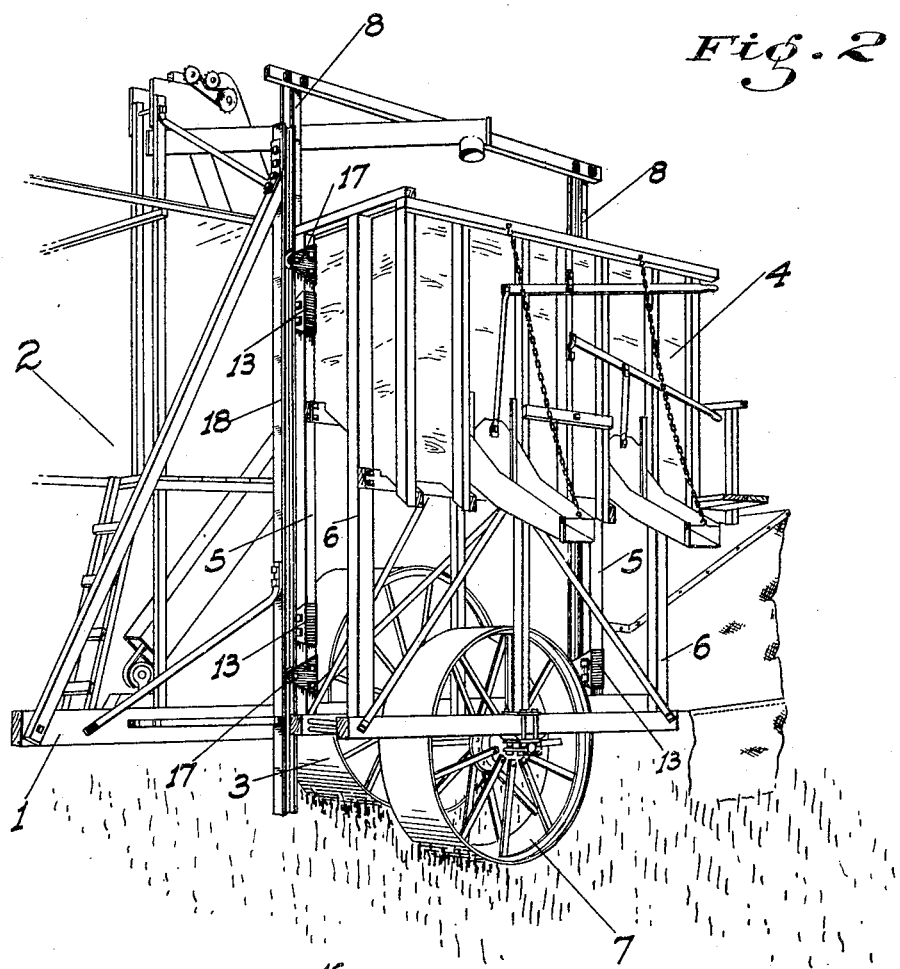
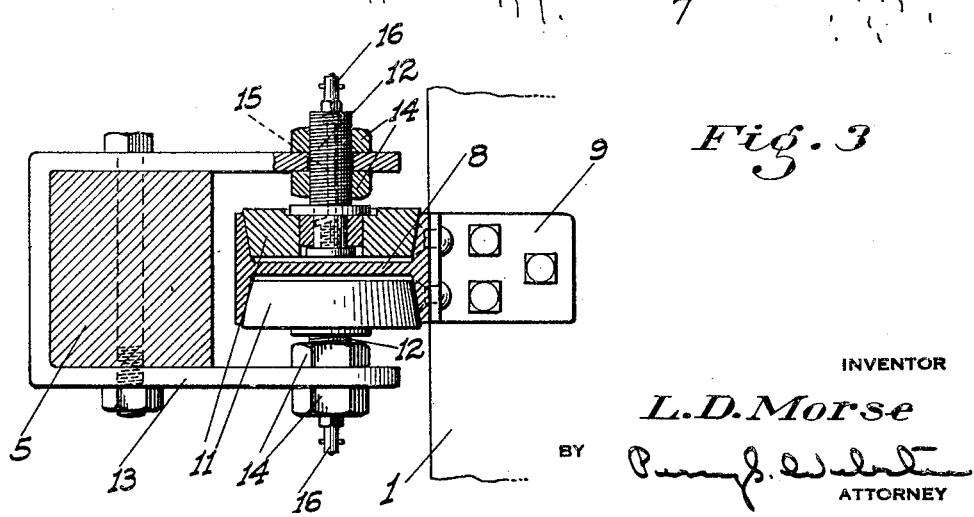

1,867,887

UNITED STATES PATENT OFFICE

LYMAN D. MORSE, OF BUTTE CITY, CALIFORNIA

ROLLER ATTACHED BULK-HANDLING ATTACHMENT FOR HARVESTERS

Application filed March 18, 1930. Serial No. 436,739.

This invention relates to flexibly mounted loose or bulk grain carrying attachments for harvesters, and particularly represents improvements over the method of mounting such attachment to the harvester as shown in my Patent No. 1,739,558 dated December 17, 1929.

The principal object of the present invention is to provide a harvester attachment of the same general nature and for the same purpose as shown in said patent, but in which the attachment is so mounted that it may have a greater range of movement, it is more firmly supported against loose play or movement in a horizontal plane relative to the harvester, and the connecting or mounting means between the two are strengthened and yet are actually simplified and less expensive to manufacture than the former arrangement. My improved mounting means therefore enables the attachment to be effectively used on side hill harvesters regardless of the steepness of the slope, and the strength and firmness of the connections insures long life to the parts and enables them to withstand strains to which they are subject in service for long periods without undue wear developing and without giving any trouble.

These objects I accomplish by means of such structure and relative arrangement of parts as will fully appear by a perusal of the following specification and claims.

In the drawings similar characters of reference indicate corresponding parts in the several views:

Fig. 2 is a perspective side view of the attachment, looking somewhat toward the rear, also showing the mounting means for the attachment at the front end.

Fig. 3 is an enlarged cross-section of an attachment supporting and guiding unit.

Figure 1:
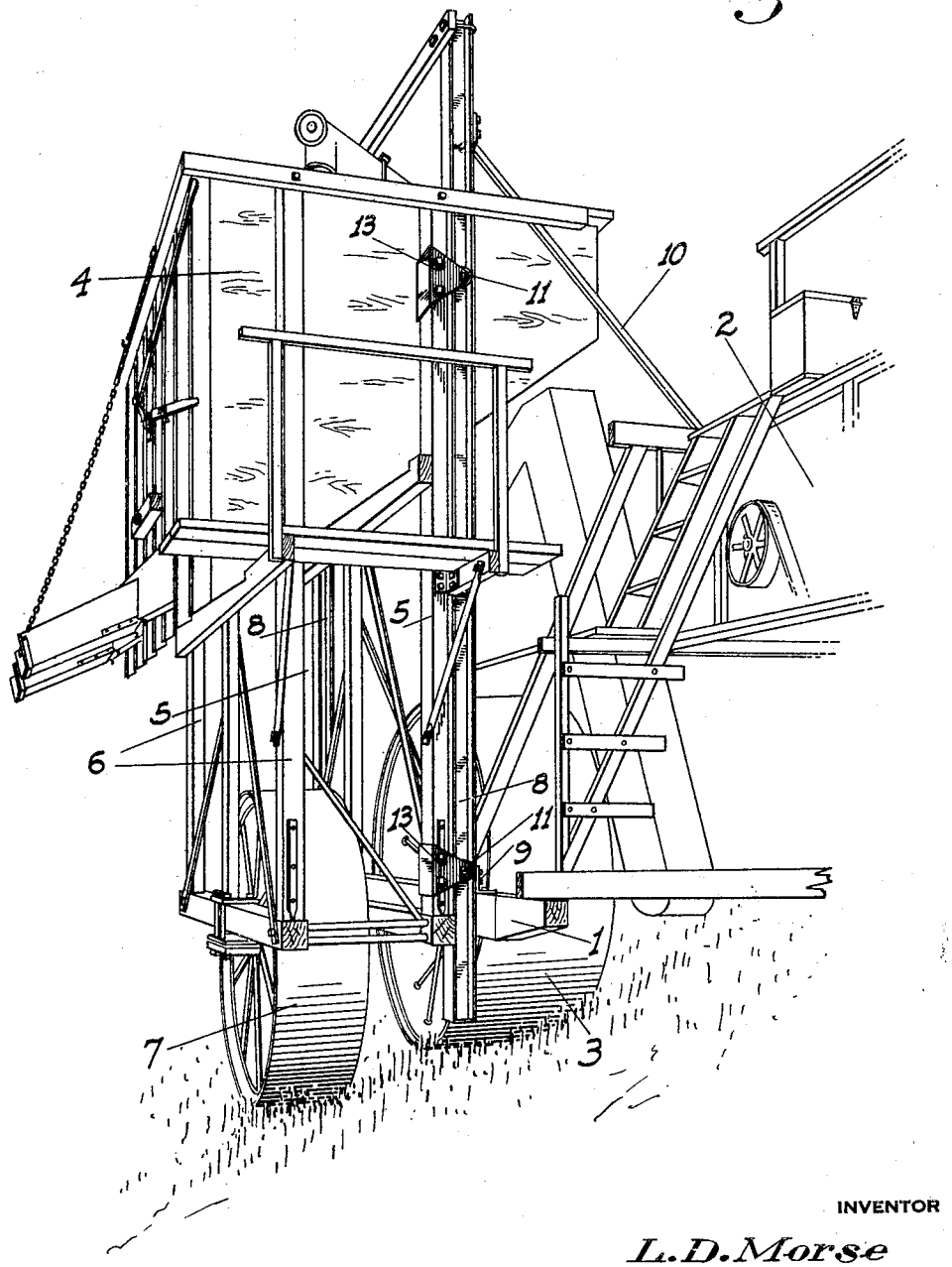
Fig. 1 is a perspective view of my bulk carrying attachment, looking from the rear, showing the improved mounting means for the same.

Referring now more particularly to the characters of reference on the drawings, the numeral 1 represents a portion of the longitudinal side frame beam of a combined harvester and thrasher 2 of standard form, which beam is supported by a ground bearing wheel 3. The bulk grain carrying attachment is disposed outwardly of the beam 1 in substantially transverse alinement with the wheel 3 and consists essentially of a raised grain bin 4, adapted to receive grain as discharged from the thrasher spout; the bin being supported by a frame which includes depending uprights arranged as longitudinally and transversely spaced inner and outer pairs 5 and 6 respectively.

The bin frame is supported from the ground by a ground bearing wheel 7 which is preferably disposed in transverse alinement with the wheel 3.

Thus far the structure is practically identical with that disclosed in the previous patent, but the bin frame is slidably supported from the harvester or thrasher in a somewhat different and improved manner, as will now be described. Disposed on the outside of and against the beam 1 are I-beams 8, arranged in transverse alinement with and adjacent the uprights 5, and set so that their flanges lie in planes longitudinally of the harvester as plainly shown. The beams are supported from the beam 1 and other rigid members of the harvester frame by suitable means such as angle brackets 9 between the beams 8 and 1, and diagonal supports or the like between the upper portion of the harvester frame and the beams 8 toward the upper ends of the latter. A standard I-beam such as I use for my purpose is inherently formed with two opposed grooves, one on each side of the central web, and having their sides flaring outwardly somewhat as shown in Fig. 3. Sliding and guiding supports between the beams 5 and 8 are in the form of vertically spaced roller units. Each unit comprises a pair of opposed rollers 11 having their faces tapered to conform to the slope of the groove sides and riding in said grooves. The rollers are turnable on spindles 12 which are supported by the opposed ears of brackets 13 which are securely strapped about the beam 5. Each spindle is threaded and is engaged by nuts 14 clamped against the opposite sides of the bracket ears. The spindles are therefore adjustable so that the rollers supported thereby may be moved easily and thus advanced into the grooves as wear developes, or so that the rollers may be relatively set so as to have the proper running fit in the grooves.

The spindles also preferably have longitudinal passages 15 leading from their outer ends to the bearing bushings of the spindles in the rollers; force feed lubricating fittings 16 being applied to the outer ends of these passages so that the bushings may be easily maintained in a properly lubricated condition at all times.

The above structure supports the beam frame for sliding movement in a vertical direction and prevents lateral displacement of said frame. The end thrust on the attachment due to the longitudinal movement of the harvester and attachment is taken off these roller units by similar roller units 17 mounted on the forward beam 5 in spaced relation to the brackets 13 and engaging the opposed grooves of another vertical I-beam 18. This latter beam is mounted on the harvester frame in longitudinal alinement with and just ahead of the forward beam 5 and is set so that its flanges are transversely disposed. This causes the axes of the engaging rollers to be also transversely disposed and places the thrust on the periphery of the rollers. The other rollers 11 therefore are free to turn in their grooves and will not be wedged into said grooves as would be the case if the roller units 17 were omitted. Similarly the units 17 are free to travel along the grooves in the beam 18 without the possibility of their being wedged, due to the presence of the rollers 11 in the combination.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. Connecting means between a thrasher and a bulk grain carrying attachment which has independent vertical movement relative to the thrasher such means including I-beams fixed rigidly to the thrasher frame and disposed vertically relative thereto with the opposed grooves of the beam facing fore and aft of the thrasher respectively, and the inner side faces of the grooves tapering toward each other, spaced clamps on the attachment having ears straddling the I-beams, a spindle in each ear projecting into one groove of the beam, a tapered roller on each spindle having a close running fit with the tapered sides of the groove, whereby a positive up and down movement of the attachment relative to the thrasher may be had without material side and end lash thereof.

2. A structure as in claim 1, the spindles being each adjustable longitudinally whereby such close running fit of the rollers may be maintained.

In testimony whereof I affix my signature.

LYMAN D. MORSE.